Nov. 1, 1932.                W. K. FLAVIN                1,886,332
                              NOISE ELIMINATOR
                             Filed Dec. 13, 1929

Inventor:
Walter K. Flavin.
by
Charles S. Gooding,
Att'y.

Patented Nov. 1, 1932

1,886,332

UNITED STATES PATENT OFFICE

WALTER K. FLAVIN, OF ARLINGTON, MASSACHUSETTS

NOISE ELIMINATOR

Application filed December 13, 1929. Serial No. 413,699.

This invention relates to a noise eliminator for plumbing systems and has for its object to provide a flexible device which may be utilized for the purpose of preventing the noises that emanate from the various fixtures of a plumbing system from being transferred throughout the system and being audible in rooms other than those in which the fixtures are located.

Another object of the invention is to embody in the flexible device a means for preventing the spaced apart ends of the supply pipe, to which the device is attached, from separating when the device is subjected to internal pressure.

The invention consists in a noise eliminator as set forth in the following specification and particularly as pointed out in the claims thereof.

Referring to the drawing.

Like numerals refer to like parts throughout the several views of the drawing.

Figure 1:
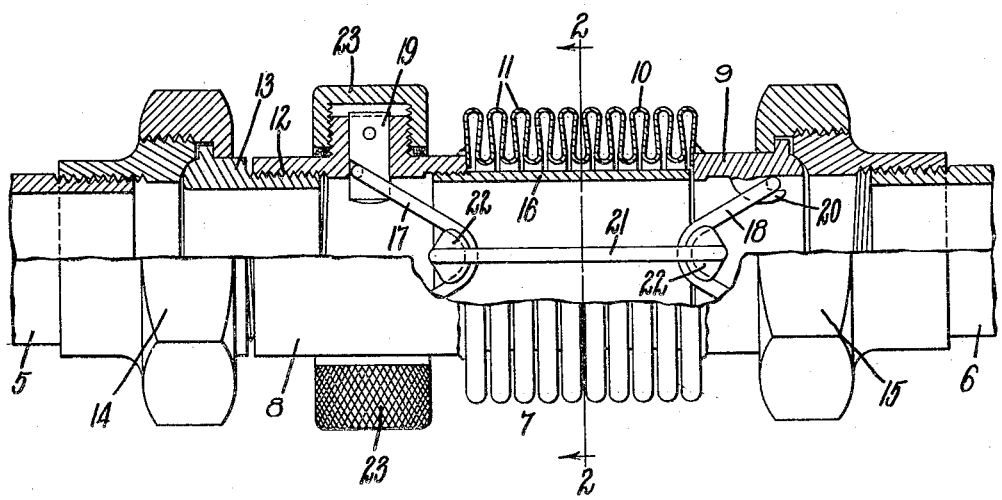
Figure 1 represents a partial side elevation and partial central longitudinal section of a noise eliminator embodying my invention.
Figure 2:
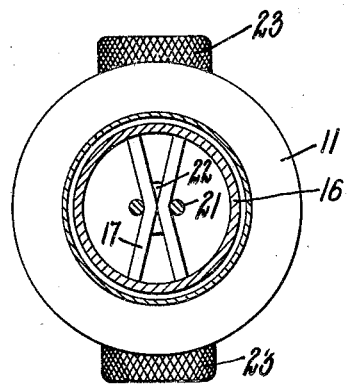
Fig. 2 is a transverse section taken on the line 2—2 of Fig. 1 looking in the direction of the arrows on said line.

In the drawing, 5 and 6 represent the spaced apart end portions of rigid pipe sections constituting the supply pipe leading to a plumbing fixture as, for example, a bathtub, wash bowl, flush tank, faucet or any other apparatus from which water is discharged and in which various forms of noises develop as a result of the discharge of said water, and 7 represents a noise eliminator which is interposed between the pipe sections 5 and 6 for the purpose of interrupting the rigid continuity of the supply pipe.

The noise eliminator 7 embodies therein a pair of oppositely disposed fluid conducting members 8 and 9 and a bellows 10, the opposite end portions of which are secured to the members 8 and 9 either by brazing, soldering or welding. The bellows 10 is constructed of resilient sheet metal and embodies therein a plurality of annular folded portions 11 which co-operate to render the bellows very flexible. The fluid conducting member 8 is internally screw-threaded at 12 to receive a member 13 of a pipe union 14 of well known form by means of which said fluid conducting member is attached to the pipe 5. The fluid conducting member 9 constitutes one of the members of a pipe union 15 by means of which the member 9 is attached to the pipe 6.

Rigidly secured in any suitable manner to the fluid conducting member 8 and, in effect, constituting an extension therefor is a tube 16 which projects from said conducting member through the bellows 10 and terminates a short distance from the fluid conducting member 9, there being sufficient space between the adjacent extremities of the tube 16 and conducting member 9 to permit each member to move independently of the other. The tube 16 and fluid conducting member 9 are, however, located sufficiently close together to, in effect, provide a continuous passageway for the passage of water through the bellows 10, and the tube furthermore constitutes a stop to limit the movement of the fluid conducting members 11 and 12 toward each other.

As there is a tendency for the pressure fluid passing through the device to cause the pipe sections 5 and 6 to separate, a means is provided for neutralizing this separating action as follows:—Mounted within the fluid conducting member 8 and extending transversely across the interior thereof is a V-shaped strut 17, and mounted within the fluid conducting member 9 and extending transversely across the interior thereof is a V-shaped strut 18. The strut 17 is detachably secured within the conducting member 8 by means of slotted pins 19 which project laterally a short distance into the interior of the conducting member 8 and are rigidly secured thereto in any suitable manner. The strut 18 is detachably mounted upon the interior of the fluid conducting member 9 upon hooks 20 that are provided upon the interior of said member.

The struts 17 and 18 are connected together by means of a link 21 which extends longitudinally through the tube 16 upon the longitudinal median line thereof and saddle portions 22 are provided at the end portions of the link 21 where it is connected to the struts 17 and 18 in order that a free movement may be permitted between said members. Caps 23 have screw-threaded engagement with the fluid conducting member 8 and enclose the portions of the latter through which the pins 19 project and prevent a leakage of the fluid from around said pins.

The general operation of the device hereinbefore specifically described is as follows:— Assuming that the device has been incorporated in a plumbing system, having been inserted between two sections of a water supply pipe leading to a plumbing fixture, if this fixture is operated as, for example, by opening a faucet, and the action of the water under pressure in flowing through the faucet causes the supply pipe to vibrate, thereby producing disagreeable noises, the vibrations will travel along the supply pipe until they reach the noise eliminator 7, whereupon said vibrations upon being transmitted to the fluid conducting member to which the pipe is attached, will cause said fluid conducting member to oscillate slightly sidewise, carrying with it the end portion of the bellows which is attached thereto. The bellows, however, being flexible will not move at its opposite end and will, therefore, transmit no sidewise movements to the fluid conducting member that is attached at its opposite end, and the link, furthermore, that is normally located upon the longitudinal median line of the device being itself flexible, will not transmit any lateral movement between the fluid conducting members. The vibrations and noises, therefore, that have been conducted along the water supply pipe from the plumbing fixture to the bellows will not be transmitted by said pipe beyond said bellows.

It is evident that the pressure fluid may travel in either direction through the device, and vibrations traveling in either direction will be arrested when they reach the bellows.

I claim:

1. A noise eliminator of the character described having, in combination, a pair of longitudinally aligning fluid conducting members, a bellows constructed of flexible sheet metal interposed between said fluid conducting members and attached at its opposite ends thereto, oppositely disposed radial pins rigidly mounted in one of the fluid conducting members, oppositely disposed hooks integral with the other fluid conducting member, a strut loosely mounted upon said pins, another strut loosely mounted upon said hooks, and a link extending through the bellows and loosely connected at its opposite ends to each of the struts.

2. A noise eliminator of the character described having, in combination, a pair of fluid conducting members, a bellows constructed of flexible sheet metal interposed between said fluid conducting members and attached at its opposite ends thereto, one of said fluid conducting members being provided with a tubular extension projecting through said bellows and terminating adjacent to the other fluid conducting member, oppositely disposed pins rigidly mounted in one of the fluid conducting members, oppositely disposed hooks integral with the other fluid conducting member, a strut loosely mounted upon said pins, another strut loosely mounted upon said hooks, and a link extending through the bellows and loosely connected at its opposite ends to each of the struts.

In testimony whereof I have hereunto set my hand.

WALTER K. FLAVIN.